(12) United States Patent
Amrhein et al.

(10) Patent No.: US 11,706,849 B2
(45) Date of Patent: Jul. 18, 2023

(54) SHAPING MACHINE

(71) Applicant: ENGEL AUSTRIA GmbH, Schwertberg (AT)

(72) Inventors: Wolfgang Amrhein, Ottensheim (AT); Hubert Mitterhofer, Hafnerbach (AT); Siegfried Silber, Kirchschlag (AT); Werner Kappelmueller, Schwertberg (AT); Andreas Prokesch, Ennsdorf (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 934 days.

(21) Appl. No.: 15/174,103

(22) Filed: Jun. 6, 2016

(65) Prior Publication Data
US 2016/0360576 A1    Dec. 8, 2016

(30) Foreign Application Priority Data

Jun. 8, 2015 (AT) .................................. A 355/2015

(51) Int. Cl.
*H05B 6/18*    (2006.01)
*H05B 6/36*    (2006.01)

(52) U.S. Cl.
CPC ................. *H05B 6/18* (2013.01); *H05B 6/36* (2013.01)

(58) Field of Classification Search
CPC .................................... H05B 6/18; H05B 6/26
USPC ....................................................... 219/602
See application file for complete search history.

(56) References Cited

U.S. PATENT DOCUMENTS

| 1,431,686 | A | * | 10/1922 | Rohn | ..................... | H05B 6/18 |
| | | | | | | 373/165 |
| 3,223,519 | A | | 12/1965 | Schippereit | | |
| 3,413,432 | A | * | 11/1968 | Hormann | ................... | B21J 9/08 |
| | | | | | | 219/602 |
| 3,549,353 | A | * | 12/1970 | Ridd | ........................ | C22B 4/00 |
| | | | | | | 117/209 |
| 5,197,081 | A | | 3/1993 | Fishman | | |
| 5,844,213 | A | * | 12/1998 | Peysakhovich | .... | B22D 11/1213 |
| | | | | | | 219/672 |

(Continued)

FOREIGN PATENT DOCUMENTS

| CN | 201089010 | 7/2008 |
| DE | 935 452 | 11/1955 |

(Continued)

OTHER PUBLICATIONS

Austrian Search Report dated Jan. 8, 2016 in Austian Application No. 355/2015, with English translation.

(Continued)

*Primary Examiner* — Dana Ross
*Assistant Examiner* — Joe E Mills, Jr.
(74) *Attorney, Agent, or Firm* — Wenderoth, Lind & Ponack, L.L.P.

(57) ABSTRACT

A shaping machine includes a melting vessel, an induction coil arranged on the melting vessel for inductively heating, in particular melting, a material, and a shaping cavity. The melting vessel has at least one irradiation region which is substantially permeable for an electromagnetic field, and the shaping machine is adapted to cool the material in the cavity in such a way that a substantially crystalline solid body is formed. A body with a higher magnetic permeability than the melting vessel is arranged overlapping the irradiation region, and the induction coil is arranged between the body and the irradiation region.

26 Claims, 2 Drawing Sheets

(56) References Cited

U.S. PATENT DOCUMENTS

| | | | |
|---|---|---|---|
| 6,550,526 B1 | 4/2003 | Brungs et al. | |
| 2005/0175064 A1 | 8/2005 | Keough | |
| 2008/0216960 A1* | 9/2008 | Schwiese | B29C 65/3656 |
| | | | 156/380.2 |
| 2010/0080259 A1* | 4/2010 | Lovens | H05B 6/104 |
| | | | 373/152 |
| 2011/0036831 A1* | 2/2011 | Warner | C21D 1/42 |
| | | | 219/660 |
| 2013/0037999 A1 | 2/2013 | Kang et al. | |
| 2013/0182740 A1* | 7/2013 | Kim | F27B 14/063 |
| | | | 373/142 |
| 2014/0332176 A1* | 11/2014 | Waniuk | B22D 27/04 |
| | | | 164/493 |
| 2014/0369375 A1* | 12/2014 | Pham | B22D 41/01 |
| | | | 373/156 |
| 2015/0013933 A1 | 1/2015 | Verreault et al. | |
| 2015/0131694 A1* | 5/2015 | Pham | F27B 14/061 |
| | | | 373/161 |

FOREIGN PATENT DOCUMENTS

| | | |
|---|---|---|
| DE | 935452 | 11/1955 |
| DE | 199 06 939 | 8/2000 |
| GB | 2 161 591 | 1/1986 |
| JP | 09-239518 | 9/1997 |
| JP | 2002-066707 | 3/2002 |
| JP | 2004-116980 | 4/2004 |
| JP | 2014-030906 | 2/2014 |
| WO | 2013/043156 | 3/2013 |
| WO | 2013/112130 | 8/2013 |

OTHER PUBLICATIONS

Han Zhicheng et al., "Electromagnetic Metallurgy Technology and Equipment" Metallurgical Industry Press, Jul. 2008, pp. 48 (the article discloses a yoke made of iron which is uniformly and symmetrically distributed around an induction coil).

* cited by examiner

SHAPING MACHINE

BACKGROUND OF THE INVENTION

The present invention concerns a shaping machine, a method of using the shaping maching, and a method of using an arrangement comprising a melting vessel and an induction coil arranged on the melting vessel.

It is known for metal to be disposed in a melting vessel and inductively heated or melted by a coil. The melt can then be conveyed into a shaping cavity in which the metal hardens. That is known from US 2013/0037999 A1, WO 2013/043156 A1, WO 2013/112130 A1, US 2015/0013933 A1 and US 2014/0332176 A1, wherein it is provided in each case that the melt is cooled so quickly as to give a substantially amorphous solid body.

The above-mentioned specifications also disclose various configurations for the melting vessel, also referred to as the boat or in English as the "crucible", and the induction coil.

In spite of those measures, that method suffers from relatively severe losses which occur by virtue of the fact that the melting vessel itself is also made from conductive metal. This means that, besides the metal which is actually to be melted, the melting vessel is also heated. That then has the result that the melting vessel itself has to be cooled as a time-consuming and laborious step.

The object of the invention is to provide an apparatus and a method whereby the effectiveness of energy deposition in the material to be heated is increased.

SUMMARY OF THE INVENTION

A basic aspect of the invention involves providing a body which is arranged in overlapping relationship with the irradiation region, and which has a higher magnetic permeability (also referred to as magnetic conductivity) than the melting vessel. In this case, the induction coil is disposed between the body and the irradiation region. The invention is therefore based on the realization that by such a body, the electromagnetic flux generated by the induction coil can be concentrated on the irradiation region. A greater proportion of the electromagnetic energy is therefore deposited directly in the material through the irradiation region, or a lesser proportion is deposited in the melting vessel (both in comparison with the state of the art). Screening of the material by the melting vessel is therefore obviated.

It is therefore surprising here, inter alia, that a body according to the invention can provide for particular energy focusing even outside the coil.

Crystalline hardening of the heated or molten material is intended for the invention. In other words, the solid body which is formed has a microscopic lattice structure. That lattice structure is distinguished by the periodic or quasi-periodic repetition of so-called unit cells. Those unit cells form the basic building block of the lattice structure, wherein the entire lattice can be obtained by translations and rotations from the unit cell.

The materials considered can generally also be present in an amorphous state in which the stated lattice structure is not present. In actual fact, the structure of a real crystal is never that of an ideal lattice as lattice defects, inclusions, and the like can never be entirely avoided. For present purposes, those solid bodies are deemed to be crystalline, which have a degree of crystallization (that is to say, the proportion of the solid body which is in the form of a crystal) of at least 50%, preferably at least 80%, and particularly preferably at least 95%. In terms of solid body physics, the amorphous phase is distinguished from the crystalline phase by the absence of so-called long-range correlations. The term long-range correlations denotes those correlations which have a weaker decay behaviour than the interaction producing the lattice bonds (interatomic and intermolecular forces).

The term shaping machines is used to denote any machines which give rise to shapeability of a material by heating or melting, and use of such shapeability for shaping purposes. That is performed in a cavity in which the material is arranged, in which case the material can also be for example pressed in the cavity.

The melting vessel can comprise a conductive material, an insulating material or a mixture of conductive and insulating materials.

The body can extend substantially parallel to a longitudinal axis of the induction coil. As a result, the electromagnetic radiation can be focused into the melting vessel over a length of the induction coil. That applies in particular when the melting vessel is cylindrical. That cylindrical configuration can have still further advantages. For example, heated or molten material can be transported from a cylinder into the cavity relatively simply by a ram or piston.

It can also be useful for complete focusing of the irradiated energy over the length of the induction coil if the body has a longitudinal extent which substantially corresponds to a longitudinal extent along the longitudinal axis of the induction coil or is greater.

The body can also be in the form of a yoke—preferably with a U-shaped profile facing towards the melting vessel. The field lines focused by the body can be focused in particularly targeted fashion into the irradiation region in that way.

The body can have a lower level of electrical conductivity than the induction coil. That can prevent the induction in the body itself of currents which would heat the body and which themselves would in turn provide for a disturbance in the magnetic field.

The body can preferably be made from a ferrite material. Ferrite in this case denotes a ferromagnetic ceramic material (that is to say, not a modification of iron). Among the ferrites, so-called soft-magnetic ferrites or ferrospinels can be preferred as they enjoy particularly high magnetic permeability with a low level of electrical conductivity (see Matthée, Lexikon der Fertigungstechnik und Arbeitsmaschinen, Deutsche Verlagsanstalt Stuttgart, 1967).

In particular, metals can be provided as materials to be heated or melted, in which respect naturally any material which is conductive to some extent is accessible to inductive heating.

The irradiation region can be formed by at least one opening in the melting vessel. An opening in the melting vessel can best be suited for irradiation of electromagnetic energy, in which respect naturally it is also possible to use smaller material thicknesses or to make a change of material to a material of lower electrical conductivity.

In geometrically appropriate fashion, the opening can have a slot, in particular when the melting vessel is cylindrical with a surrounding coil. Particularly preferably, at least one conductor loop of the induction coil can surround the melting vessel, in which respect preferably substantially all conductor loops of the induction coil surround the melting vessel. That can be advantageous as the greatest magnetic field strength occurs in the interior of the conductor loops.

The induction coil and the melting vessel can be arranged substantially concentrically.

After heating or melting, before it has hardened, the material can be transported into the cavity which imparts the desired shape. In particular, in the case of a cylindrical melting vessel, that can be effected by a ram.

The material can be produced in the form of a bar which can preferably be cylindrical. That bar is often also referred to as the "ingot" (from the English term).

BRIEF DESCRIPTION OF THE DRAWINGS

Further details and advantages of the invention will be apparent from the Figures and the related specific description. In the Figures.

DETAILED DESCRIPTION OF THE INVENTION

Figure 1:
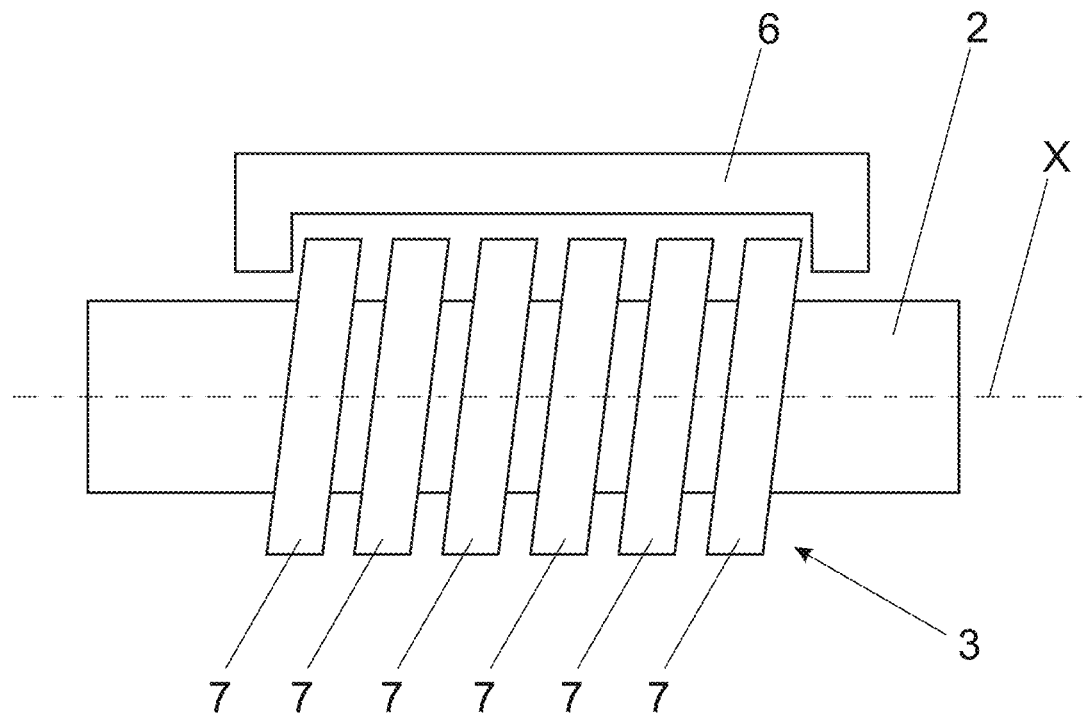
FIG. 1 is a diagrammatic side view of an arrangement according to the invention comprising a melting vessel, an induction coil, and a body.

FIG. 1 diagrammatically shows a melting vessel 2 which in this case is in the form of a hollow cylinder formed of a wall surrounding a melting cavity. The melting vessel 2 is surrounded by the conductor loops 7 of the induction coil 3. In this embodiment, the longitudinal axis X of the induction coil 3 also forms the longitudinal axis of the melting vessel 2. The melting vessel 2 and the induction coil 3 are therefore arranged concentrically. It is also possible to see the body 6. This is made from a soft-magnetic ferrite material.

Figure 2:
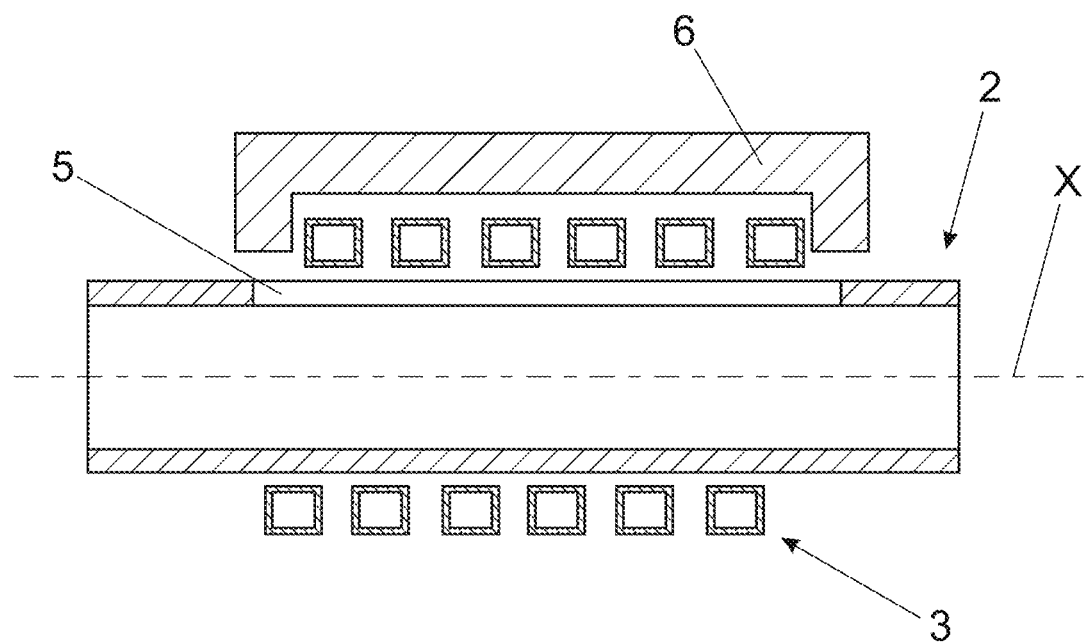
FIG. 2 is a diagrammatic sectional view from FIG. 1.

The sectional view in FIG. 2 shows how the body 6 is arranged in relation to the irradiation region 5 of melting vessel 2. In this case, the irradiation region 5 is in the form of a slot extending through the wall of the melting vessel 2 at the top side of the melting vessel 2 (see FIG. 3). (The slot is so narrow that it is substantially not visible in the side view in FIG. 1).

The body 6 is in the form of a yoke with a U-shaped profile. The U-shaped profile embraces the induction coil 3. As a result, the magnetic field lines concentrated in the body 6 are passed directly into the irradiation region.

Figure 3:
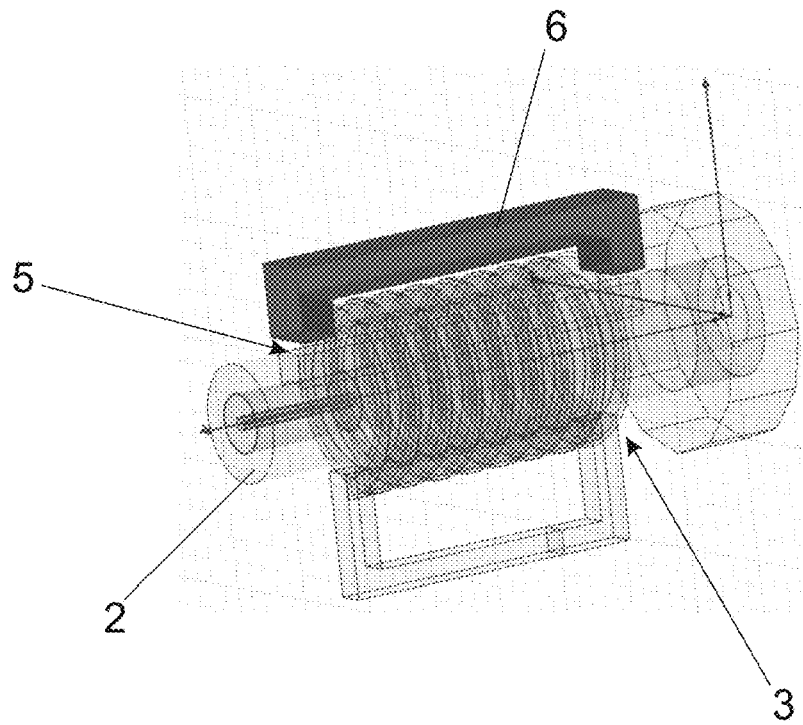
FIG. 3 is a perspective view of the arrangement in FIG. 1.

FIG. 3 shows a perspective view of the embodiment of FIGS. 1 and 2. It has substantially the same elements, but in part with more details. FIG. 3 is intended to give an impression of how the individual described items are arranged spatially relative to each other.

It is to be noted that the opening serving as the irradiation region 5 can also be somewhat wider.

Figure 4:
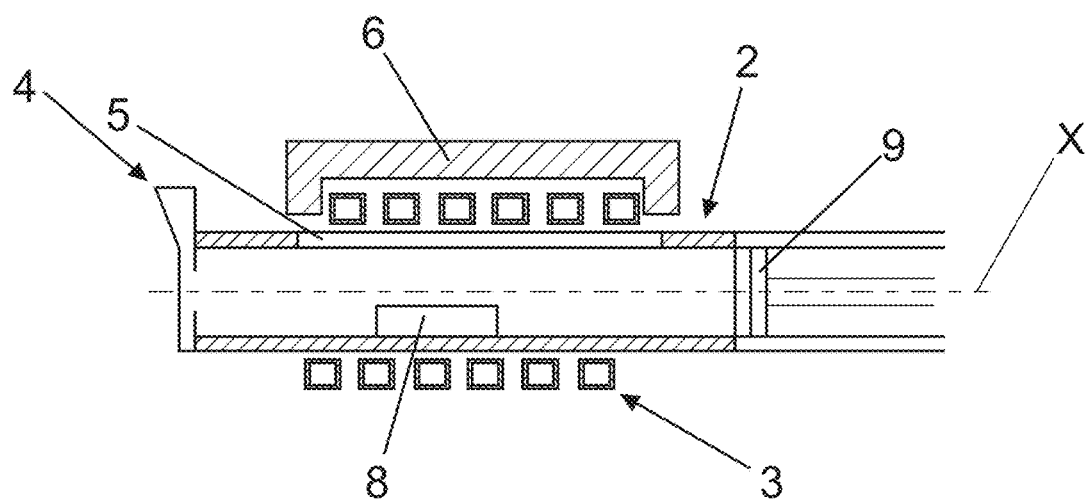
FIG. 4 is a diagrammatic sectional view of a shaping machine according to the invention.

FIG. 4 is a diagrammatic sectional view, wherein further elements of the entire shaping machine are diagrammatically illustrated, in addition to the elements from FIG. 2. The material—in this case an ingot 8 of metal—is melted in the arrangement according to the invention. The molten material is urged into the shaping cavity 4 by a ram 9. The material hardens at least in partly crystalline form in the cavity 4.

Figure 5:
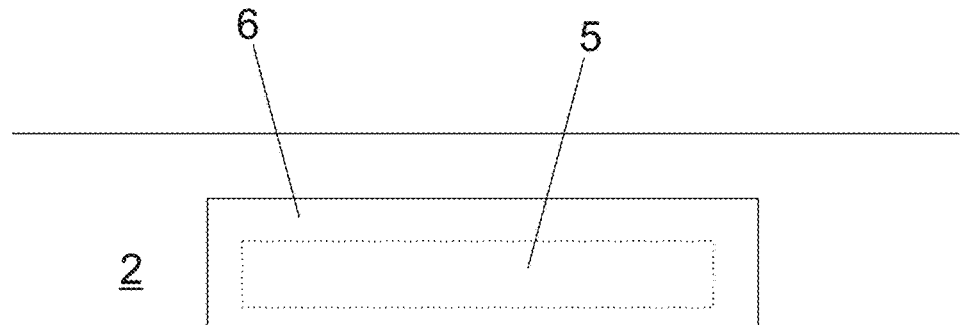
FIG. 5 is a plan view of the arrangement of FIG. 1.

FIG. 5 is a plan view of the arrangement of FIG. 1. In this case, the induction coil 3 is not shown for the sake of clarity. The body 6 can be seen above the melting vessel 2 in the plan view. The irradiation region 5 of the melting vessel 2 is indicated in broken line. As can be seen, the body 6 completely overlaps the irradiation region 5 in the radiation introduction direction. At least a part of the technical effect, however, can also be achieved if the body 6 does not completely overlap the irradiation region 5 but only partially. The direction from which the overlap is viewed can preferably be a direction in which irradiation of the electromagnetic field takes place through the irradiation region 5.

The invention claimed is:

1. A shaping machine comprising:
a melting vessel having an irradiation region permeable to an electromagnetic field, the irradiation region being formed of an opening in the melting vessel;
an induction coil arranged on the melting vessel for inductively heating a material;
a shaping cavity; and
a body having a higher magnetic permeability than the melting vessel, the body being arranged to overlap the opening forming the irradiation region of the melting vessel without surrounding the melting vessel, and the induction coil being arranged between the body and the irradiation region;
wherein the shaping cavity is configured to allow the material in the shaping cavity to cool such that a crystalline solid body is formed, and
wherein the induction coil is arranged between the body and the irradiation region, and the body is configured to concentrate electromagnetic flux generated by the induction coil onto the irradiation region.

2. The shaping machine as set forth in claim 1, wherein the body extends parallel to a longitudinal axis of the induction coil.

3. The shaping machine as set forth in claim 1, wherein the body has a length greater than or equal to a length along the longitudinal axis of the induction coil.

4. The shaping machine as set forth in claim 1, wherein the body is in the form of a yoke.

5. The shaping machine as set forth in claim 1, wherein the body has an electrical conductivity lower than an electrical conductivity of the induction coil.

6. The shaping machine as set forth in claim 1, wherein the body is made from a ferrite material.

7. The shaping machine as set forth in claim 1, wherein the melting vessel is cylindrical.

8. The shaping machine as set forth in claim 1, wherein the opening in the melting vessel is an elongated opening extending in a longitudinal direction of the melting vessel.

9. The shaping machine as set forth in claim 8, wherein the opening is a slot.

10. The shaping machine as set forth in claim 1, wherein a conductor loop of the induction coil surrounds the melting vessel.

11. The shaping machine as set forth in claim 7, wherein the induction coil and the melting vessel are arranged concentrically.

12. The shaping machine as set forth in claim 1, wherein the induction coil is configured to inductively melt the material.

13. The shaping machine as set forth in claim 4, wherein the yoke has a U-shaped profile with an opening facing towards the melting vessel.

14. The shaping machine as set forth in claim 6, wherein the body is made from a soft-magnetic ferrite material.

15. The shaping machine as set forth in claim 10, wherein the conductor loop is one of a plurality of conductor loops of the induction coil all surrounding the melting vessel.

16. The shaping machine as set forth in claim 1, wherein the melting vessel further has a vessel body, the irradiation region of the melting vessel having a higher magnetic permeability than the vessel body of the melting vessel.

17. The shaping machine as set forth in claim 1, wherein the melting vessel is formed of a wall surrounding a melting cavity, the opening forming the irradiation region extending through the wall of the melting vessel to allow an exterior of the melting vessel to communicate with the melting cavity for allowing radiation to enter the melting cavity of the melting vessel.

18. A method of inductively heating and crystalline hardening a material, the method comprising:
providing a melting vessel having an irradiation region permeable to an electromagnetic field, the irradiation region being formed of an opening in the melting vessel;
arranging the material in the melting vessel and inductively heating the material by an induction coil; and
cooling the material in a shaping cavity such that a crystalline solid body is formed,
wherein the providing of the melting vessel includes arranging a body in an overlapping relationship with the irradiation region such that the body overlaps the opening forming the irradiation region of the melting vessel without surrounding the melting vessel, the body having a higher magnetic permeability than the melting vessel,
wherein the providing of the melting vessel further includes arranging the induction coil between the body and the irradiation region and configuring the body to concentrate electromagnetic flux generated by the induction coil onto the irradiation region.

19. The method as set forth in claim 18, wherein the material is a metal.

20. The method as set forth in claim 18, further comprising transporting the material into the cavity after inductively heating and prior to hardening.

21. The method as set forth in claim 18, wherein the arranging of the material comprises arranging material in a form of a cylindrical ingot.

22. The method as set forth in claim 18, wherein the inductively heating the material comprises melting the material.

23. A method of using an arrangement comprising a melting vessel and an induction coil arranged on the melting vessel to treat a material, the method comprising:
providing the melting vessel with an irradiation region permeable to an electromagnetic field, the irradiation region being formed of an opening in the melting vessel;
arranging a body having a higher magnetic permeability than the melting vessel in an overlapping relationship with the irradiation region such that the body overlaps the opening forming the irradiation region of the melting vessel without surrounding the melting vessel;
arranging the induction coil between the body and the irradiation region and configuring the body to concentrate electromagnetic flux generated by the induction coil onto the irradiation region; and
inductively heating and crystalline hardening of the material by the arrangement.

24. The method as set forth in claim 13, wherein the melting vessel is formed of a wall surrounding a melting cavity, the opening forming the irradiation region extending through the wall of the melting vessel to allow an exterior of the melting vessel to communicate with the melting cavity for allowing radiation to enter the melting cavity of the melting vessel.

25. The method as set forth in claim 16, wherein the melting vessel is formed of a wall surrounding a melting cavity, the opening forming the irradiation region extending through the wall of the melting vessel to allow an exterior of the melting vessel to communicate with the melting cavity for allowing radiation to enter the melting cavity of the melting vessel.

26. The method as set forth in claim 23, wherein the inductively heating the material by an induction coil comprises melting the material.

\* \* \* \* \*